United States Patent [19]

Yoshida et al.

[11] Patent Number: 5,007,495
[45] Date of Patent: Apr. 16, 1991

[54] PROPULSIVE AIR STREAM DEFLECTING APPARATUS FOR AIR CUSHION VEHICLE

[75] Inventors: Ryuichi Yoshida, Takarazuka; Tetsushi Yamamura, Takasago; Koji Kadota, Kobe, all of Japan

[73] Assignee: Kawasaki Jukogyo Kabushiki Kaisha, Hyogo, Japan

[21] Appl. No.: 436,784

[22] Filed: Nov. 15, 1989

[30] Foreign Application Priority Data

Nov. 16, 1988 [JP] Japan ............................ 63-148499[U]

[51] Int. Cl.⁵ .............................................. B60V 1/14
[52] U.S. Cl. .................................. 180/117; 244/110 B
[58] Field of Search ............... 180/116, 117, 118, 119, 180/120, 121, 122; 440/40, 41, 43; 114/166; 244/110 B

[56] References Cited

U.S. PATENT DOCUMENTS

| 2,735,264 | 2/1956 | Jewett | 244/110 B |
| 3,241,627 | 3/1966 | Hart et al. | 180/118 |
| 3,468,394 | 9/1969 | Winter | 180/117 |
| 3,612,208 | 10/1971 | Ferguson | 180/120 |
| 3,869,020 | 3/1975 | Holland | 180/120 |
| 3,942,464 | 3/1976 | Schoell | 440/41 |

FOREIGN PATENT DOCUMENTS

| 0595618 | 4/1960 | Canada | 244/110 B |
| 1579625 | 7/1969 | France | 180/116 |
| 2593132 | 7/1987 | France | 180/117 |

*Primary Examiner*—Charles A. Marmor
*Assistant Examiner*—Anne Marie Boehler
*Attorney, Agent, or Firm*—Wenderoth, Lind & Ponack

[57] ABSTRACT

A propulsive air stream deflecting apparatus for an air cushion vehicle is provided on the hull of the air cushion vehicle for arcuately deflecting the propulsive air stream from the open rear end of the air duct, mounted to the hull. The deflecting mechanism provides a steering thrust to the air cushion vehicle. The deflecting mechanism is pivotable about a vertical pivot mounted to the hull between a propulsive thrust producing position, where the deflecting mechanism is located away from the propulsive air stream issuing from the rear open end of the air duct, and a forward thrust producing position where the deflecting mechanism fully covers the rear open end of the air duct for deflecting the propulsive air stream to create the forward thrust to the hull. The deflecting mechanism is operatively connected to a controlling mechanism which controls the pivotal movement of the deflecting mechanism to locate the deflecting mechanism at a position between the propulsive thrust producing position and the forward thrust producing position.

6 Claims, 8 Drawing Sheets

PROPULSIVE AIR STREAM DEFLECTING APPARATUS FOR AIR CUSHION VEHICLE

BACKGROUND OF THE INVENTION

The present invention relates to a propulsion air stream deflecting apparatus of an air cushion vehicle or a ground-effect machine (hereinafter referred to as ACV) for controlling the direction of a pressurized air stream, produced by a propeller, for providing a propulsion thrust or steering thrust to the ACV.

Air cushion vehicles are provided with a pressurized air stream deflecting apparatus using a pair of rudders for generating a propulsive thrust. A typical example of such a pressurized air stream deflecting apparatus is disclosed in Japanese Patent (unexamined) Publication No. 52-81815 published on July 8, 1977. The apparatus has a horizontal cylindrical air duct mounted on the rear part of the hull of the ACV and extending in the fore-to-aft direction. A propeller fan is installed in the air duct. The air duct is provided with vertical rudders at the rear end thereof.

The known ACV is steered by turning the rudders to the port or starboard side. To brake the vehicle moving forward, the rudders are manually moved with a considerably large magnitude of force to close the rear open end of the air duct. When the ACV travels at a high speed, it is hard to fully close the rear open end of the air duct and hence there is a disadvantage in that a sufficient breaking force may not be applied to the ACV. When the air duct is closed at the rear end, a substantially annular air guide installed around the rear end of the air duct operates to receive the air stream and turn it in the reverse direction, that is, forwardly of the vehicle, as will be described hereinafter in more detail. The reverse air stream is, however, produced to some degree, even when the ACV is advancing, thus decreasing the propulsion thrust. Moreover, the air guide narrows the cross-sectional area of the path of the pressurized air stream through the air duct, so that the resistance to the air stream is increased, reducing the propulsive thrust. In addition, eddy currents are created in the narrow path at the guide and generate noise.

SUMMARY OF THE INVENTION

It is an object of the present invention to provide a propulsive air stream deflecting apparatus for an air cushion vehicle, which apparatus facilitates the deflection of the propulsive air stream for steering with simple structure without a substantial reduction of the propelling thrust and with reduced noise as compared to the known apparatus.

In view of this and other objects, the present invention provides a propulsive air stream deflecting apparatus for an air cushion vehicle including a hull. The propulsive air stream deflecting apparatus comprises: an air duct mounted on the hull and including a propeller fan installed therein to produce the propulsive air stream in the air duct for providing a rearward thrust to the hull, the air duct including a rear open end; deflecting means for arcuately deflecting the propulsive air stream from the open rear end of the air duct to provide a steering thrust to the air cushion vehicle, the steering thrust including a sideward thrust and a forward thrust; pivotally supporting means for supporting the deflecting means for pivotal movement about a vertical axis between a propulsive thrust producing position, where the deflecting means is located away from the propulsive air stream issuing from the rear open end of the air duct, and a forward thrust producing position where the deflecting means is located to fully cover the rear open end of the air duct for deflecting the propulsive air stream to create the forward thrust to the hull; and controlling means, operatively connected to the deflecting means, for controlling the pivotal movement of the deflecting means to locate the deflecting means at a position between the propulsive thrust producing position and the forward thrust producing position.

The present invention will now be described in detail by way of examples with reference to the accompanying drawings.

DETAILED DESCRIPTION OF THE PREFERRED EMBODIMENTS

Prior to the description of the preferred embodiments of the present invention, the known air stream deflecting apparatus discussed before will be described briefly below for a better understanding of the background art and disadvantages thereof.

Figure 14:
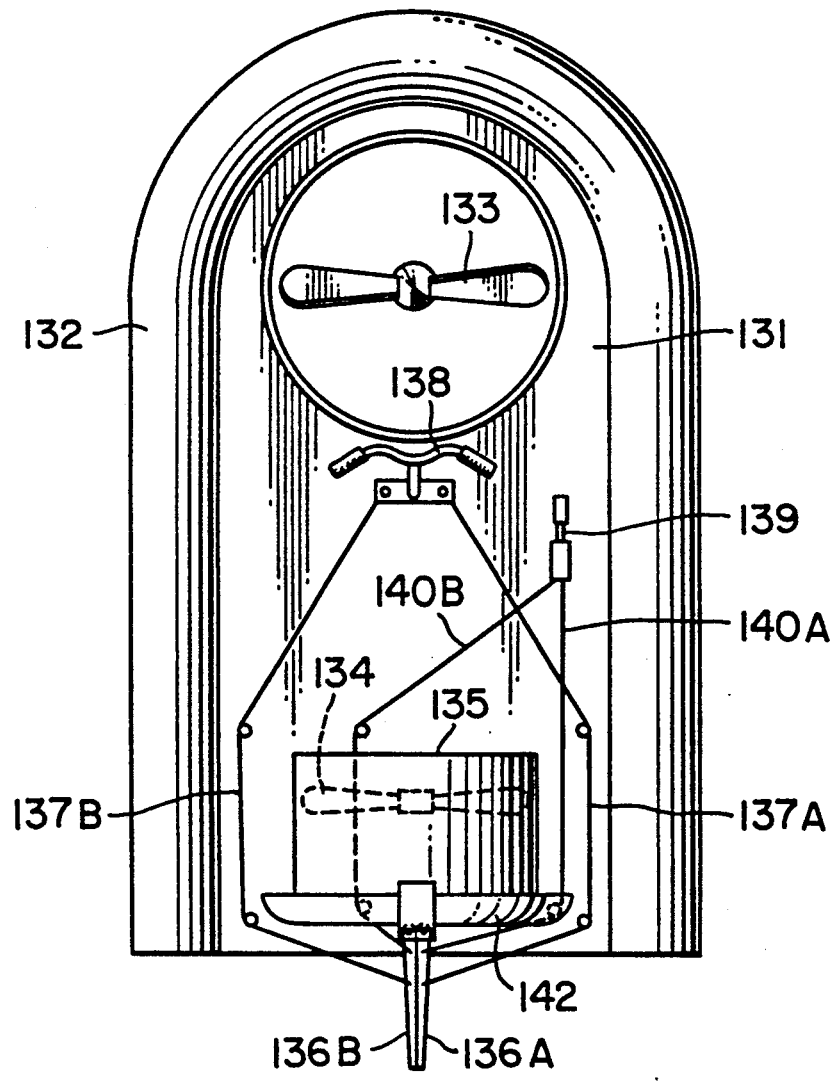
FIG. 14 is a diagrammatic plan view of an ACV using the known propulsion air stream deflecting apparatus.
Figure 15:
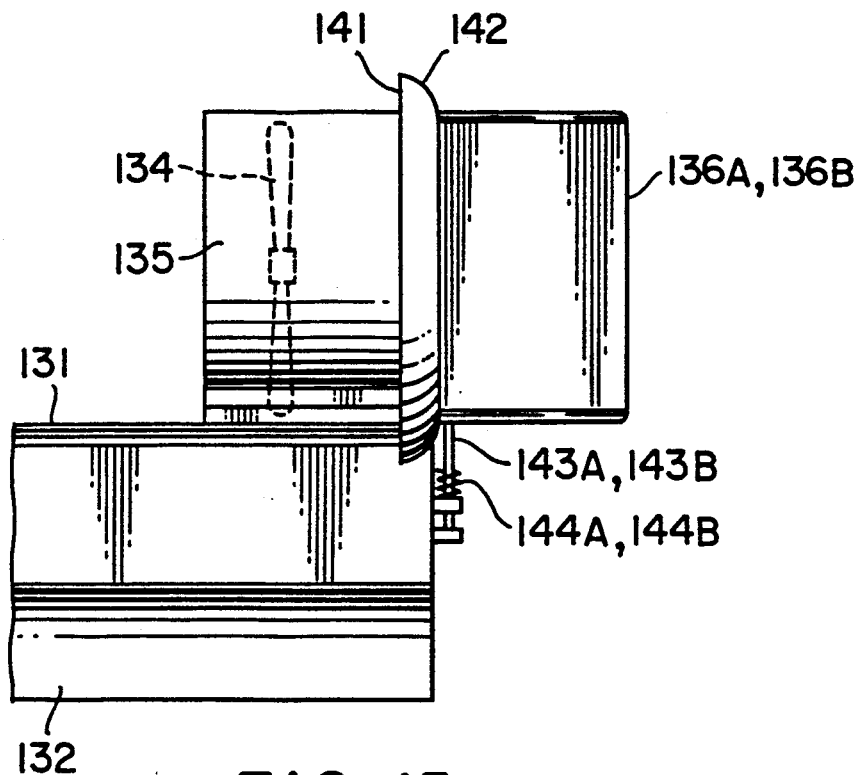
FIG. 15 is a fragmentary, enlarged side view of the ACV of FIG. 14, illustrating the air duct with rudders.
Figure 16:
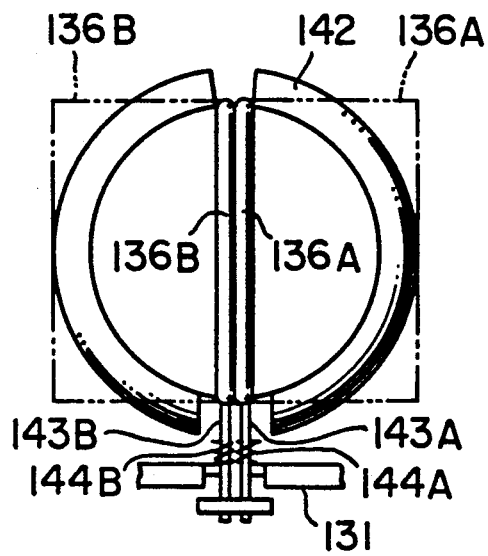
FIG. 16 is a rear view of the air duct of FIG. 15.

FIGS. 14-16 illustrate a typical example of known small-sized hovercrafts having a lifting fan 133 and a propeller fan 134. The hovercraft is provided with a pressurized air stream deflecting apparatus using a pair of rudders 136A and 136B for producing a propulsion thrust. Such a hovercraft is disclosed in Japanese Patent (unexamined) Publication No. 52-81815.

In FIGS. 14-16, reference numeral 131 designates a hull of the hovercraft, having a skirt 132. The propulsion air stream deflecting apparatus of this hovercraft includes a horizontal cylindrical air duct 135 at the rear of the hull 131, and air rudders 136A and 136B are mounted to the hull 131 immediately behind the air duct 135 for rotation about vertical axes. The rudders are steered by a steering handle 138 via cables 137A and 137B. A brake lever 139 is mounted near the steering handle 138 and is also connected via cables 140A and 140B to the rudders 136A and 136B for causing the rudders 136A and 136B to open and close the rear end of the air duct 135. An air stream guide 142, which includes a pair of semicircular flange members as shown in FIG. 16, is mounted immediately behind the rear end of the air duct 135. The air stream guide 142 defines an air flow path for directing pressurized air, produced by the propeller fan 134, forwards when the air duct 135 is closed by the rudders 136A and 136B. Each of the rudders 136A and 136B is normally kept in the position shown by the solid line in FIGS. 14-16, by a spring 144A or 144B which is mounted around a mounting shaft 143A or 143B thereof.

Figure 17:
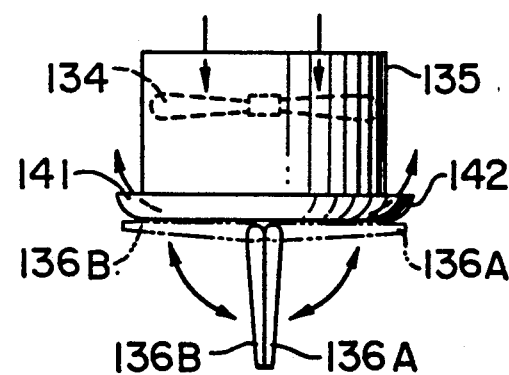
FIG. 17 is a diagrammatic plan view of the air duct, with the rudders, of FIG. 14.

When the steering handle 138 is turned to the right or left, the rudders 136A and 136B are angularly moved for turning the hull 131 in the corresponding direction. To brake the hovercraft, the brake lever 139 is manipulated to turn the rudders 136A and 136B by way of the cables 140A and 140B through an angle of 90° in the opposite directions, thereby closing the rear opening of the air duct 135 as illustrated by the dots-and-dash lines in FIGS. 16 and 17. Thus, the propelling air stream produced by the propeller fan 134 impinges upon the closed rudders and then is guided by the guide 142 to flow forwards so that a forward propelling thrust is provided to the hull 131 for braking or stopping the vehicle's forward movement. Release of the brake lever 139 allows the rudders 136A and 136B to return to their respective original positions by both the restoring force of the springs 144A and 144B and the backward flow of the pressurized air for accelerating or restarting forward travel of the vehicle.

Although the known ACV is capable of applying a braking force to the hull or moving it backwards without stopping the engine, it has the following drawbacks. First, the air path of the guide 142 which opens forwards causes part of the pressurized air from the propeller fan 134 to flow forwards, so that there occurs a decrease in the propulsion thrust to the hull and hence a decrease in both the speed and acceleration thereof. Second, the path of the pressurized air through the air duct 135 is narrowed at the guide 142. The flow resistance against the pressurized air is thus increased at the guide 142, resulting in a considerable drop in the propulsion thrust to the hull. Third, an eddy air current is created in the narrow path at the guide 142, generating noises. Lastly, a sufficient braking force may not be applied to the ACV. In braking the vehicle moving forward, the rudders are manually moved to close the rear open end of the air duct, and hence a counterforce due to the air stream which is produced by the propelling fan 134 is exerted on the braking cables 140A and 140B. When the ACV travels at a high speed, it is hard to fully close the rear open end of the air duct.

Figure 1:
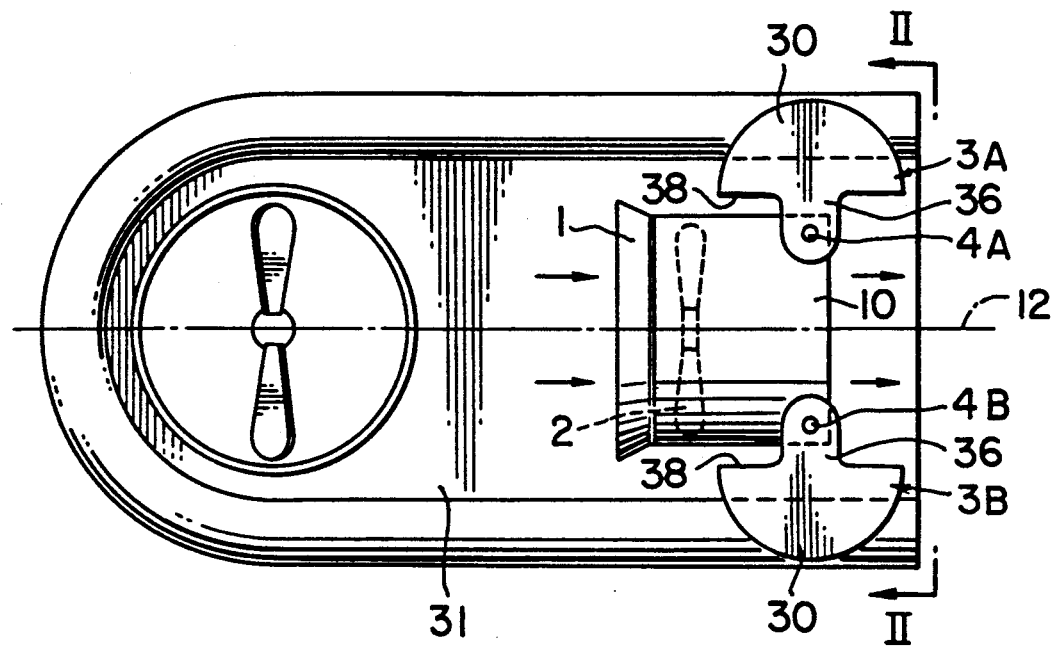
FIG. 1 is a plan view of a propulsion air stream deflecting apparatus for an ACV according to the present invention, with an air stream deflector controlling mechanism omitted for purposes of illustration.
Figure 2:
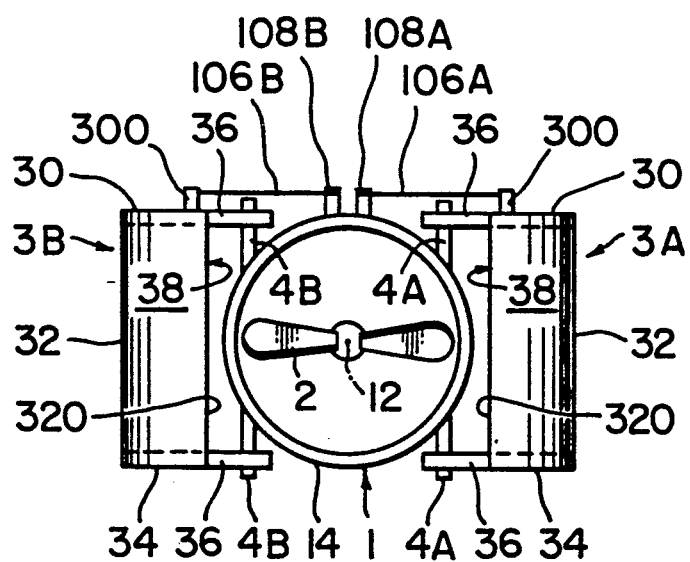
FIG. 2 is sectional a view taken along line II—II in FIG. 1.
Figure 3:
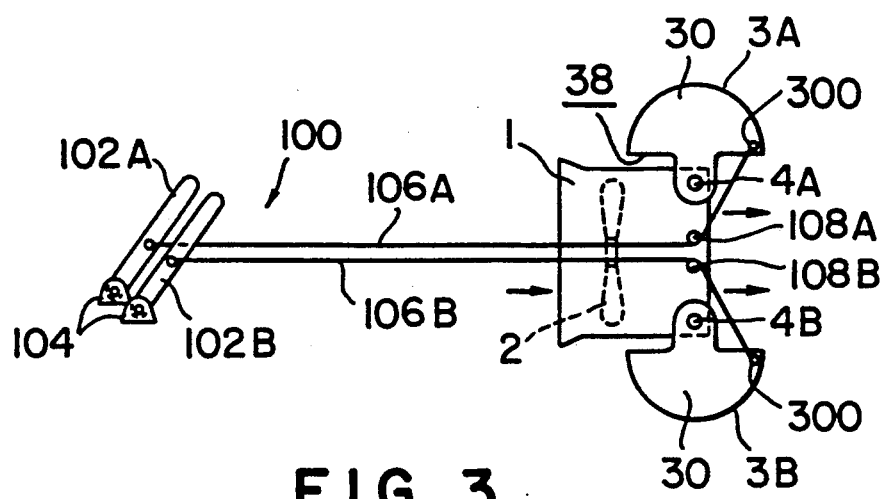
FIG. 3 is a schematic plan view, on a reduced scale, of the propulsion air stream deflecting apparatus of FIG. 1 with air stream deflector controlling mechanism, the view showing a state in which the ACV is moving forward.

Referring now to FIGS. 1-3, there is disclosed a two baskets type a propulsion air stream deflecting apparatus of the present invention, in which reference numeral 1 designates an air duct mounted at the rear end of the hull 31 of a hovercraft. The air duct 1 has a propelling fan 2 incorporated in it. A pair of bucket-shaped or generally hollow semi-cylindrical air stream deflectors 3A and 3B are pivotable about respective vertical pivots 4A and 4B which are mounted to an open rear end portion 10 of the air duct 1 in a horizontally symmetrical manner with respect to an axis 12 of the duct 1. Each of the air stream deflectors 3A and 3B includes a semicircular top plate 30, an arcuate circumferential wall 32 depending from the top plate 30, and a semicircular bottom plate 34 closing the bottom end of the circumferential wall 32, and has a rectangular opening 38 defined by a peripheral edge thereof. Each of the air stream deflectors 3A and 3B has center lugs 36, 36 formed integrally with its top plate 30 and bottom plate 34, respectively. The center lugs 36, 36, . . . are pivotally mounted to the air duct 1 by means of vertical pivots 4A and 4B. As clearly shown in FIGS. 3-5, the air stream deflectors 3A and 3B are connected to an air stream deflecting member controlling mechanism 100 for controlling angular positions thereof about respective vertical pivots 4A and 4B. The deflecting member controlling mechanism 100 includes a pair of controlling levers 102A and 102B pivotally mounted to the hull 31 by means of respective brackets 104. Each of the control levers 102A and 102B is connected to the corresponding air stream deflector 3A or 3B at a corner 300 of the top plate 30 thereof via a push-pull steering cable 106A or 106B which extends over a guide pin 108A or 108B. The push-pull steering cables 106A and 106B are capable of transmitting both pushing and pulling forces, exerted by the control levers 102A and 102B, to respective air stream deflectors 3A and 3B.

In operation, the control levers 102A and 102B are normally placed at a rearward position, shown in FIG. 3, for driving the ACV forwards. With the control levers 102A and 102B at the forward position, the air stream deflectors 3A and 3B are placed at respective fully opened positions or propulsive thrust producing positions where the air stream deflectors 3A and 3B are located symmetrically about the axis 12 to fully open the rear end 14 of the air duct 1 thus, the air stream, produced by the propelling fan 2, is allowed to flow backward for imparting forward movement to the ACV without any resistance from the air stream deflectors 3A and 3B.

Figure 4:
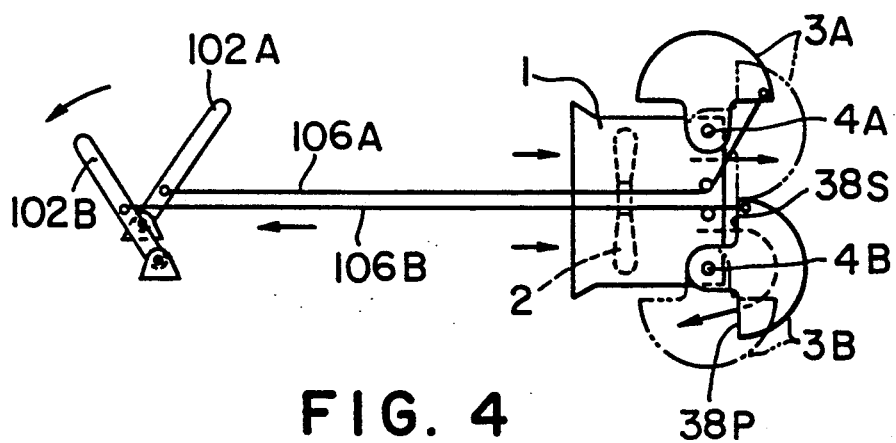
FIG. 4 is a schematic plan view of the propulsion air stream deflecting apparatus of FIG. 3, in which a sideward thrust is created.

To turn the ACV sideward, for example, to the port side, the port-side control lever 102B is pushed forwards to a shifted position, with the starboard-side control levers 102A remaining at the rearward position, as illustrated in FIG. 4. As a result, the port side air stream deflector 3B is pulled via the steering cable 106B, so that the port side air stream deflector 3B is turned about the vertical pivot 4B toward the axis 12 in a counterclockwise direction as viewed in FIG. 4 and reaches a closing position where the port side air stream deflector 3B covers one half of the open rear end 14 as shown. In this case, the propulsion air stream flows into the port side air stream deflector 3B through a starboard side 38S of the opening 38 and is deflected by the circumferential wall 32 of the port side air stream deflector 3B so as to flow obliquely forward The resulting air stream is forced out of a port side 38P of the opening 38, so that the rear portion of the hull 31 is pushed toward the starboard side. This causes the ACV to turn toward the port side. If a starboard side turn is desired, a similar operation of the starboard side control levers 102A may be accomplished, so that the air stream deflectors 3A and 3B are placed in respective positions shown by the dot-and-dash line in FIG. 4. In this case, the propulsion air stream is deflected by the port side air stream deflector 3A with the result that the rear portion of the hull 31 is forced toward the port side.

Figure 5:
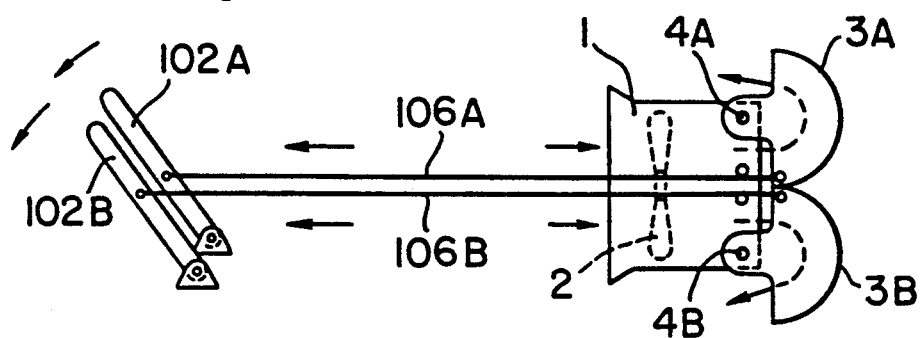
FIG. 5 is a schematic plan view of the propulsion air stream deflecting apparatus of FIG. 3, in which a rearward thrust is provided to the ACV.

For driving the ACV backward, the control levers 102A and 102B are pushed forward to the shifted positions shown in FIG. 5. Consequently, the air stream deflectors 3A and 3B are pulled by cables 106A and 106B to turn about vertical pivots 4A and 4B to forward thrust producing positions shown therein, where the air stream deflectors 3A and 3B come into contact with each other at adjacent side edges 320 of their arcuate circumferential walls 32. In this state, the air stream deflectors 3A and 3B are arranged horizontally symmetrically and therefore fully cover the open rear end 14 of the air duct 1 As a result, the pressurized air stream is deflected by the air stream deflectors 3A and 3B and issues obliquely forward therefrom, as shown in FIG. 5, to provide a forward thrust to the ACV. By applying this operation to the ACV which is advancing, it is rapidly decelerated and then stopped. The ACV may commence rearward movement by further mounting this operation. The ACV may hover by placing, in FIG. 5, the air stream deflectors 3A and 3B with such an appropriate gap that a backward thrust which is created by the pressurized air stream issuing out through the gap is made equal to a forward thrust which is provided by the forward air stream deflected with the air stream deflectors 3A and 3B. This is accomplished even in a one-engine one-fan type ACV. In this embodiment, with such a simple propulsion air flow deflecting apparatus, the ACV may be turned or braked during forward movement and may also achieve backing or hovering.

Figure 6:
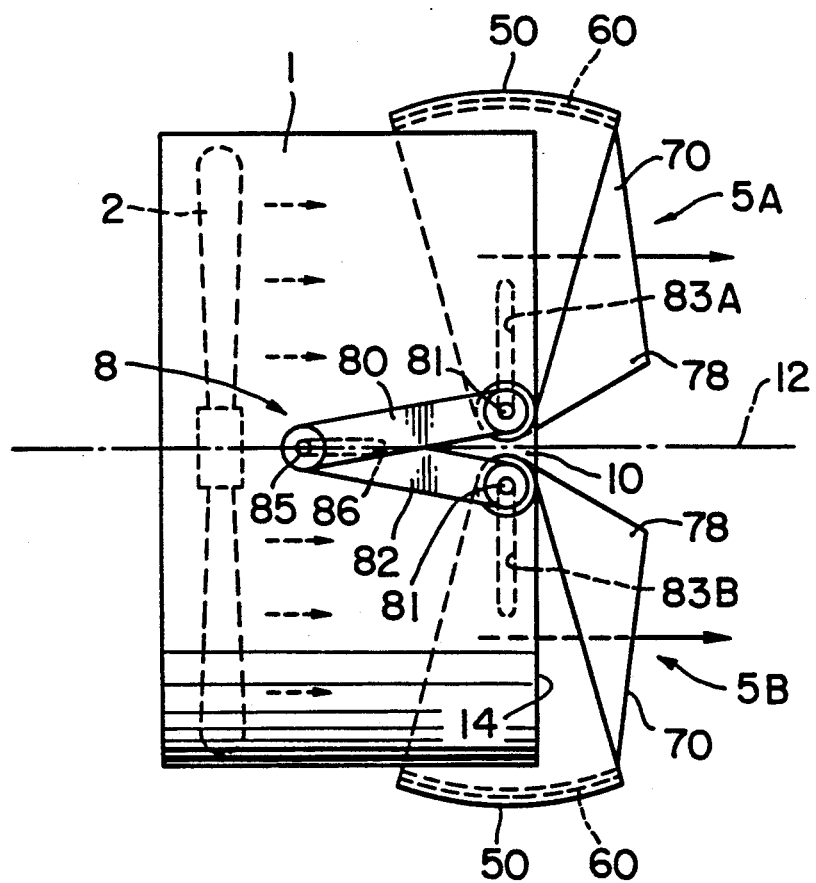
FIG. 6 is a plan view of an air duct, with a pair of propulsion air stream deflecting assemblies of a second embodiment of the present invention, with an air stream deflector assembly controlling mechanism omitted for purposes of illustration.
Figure 7:
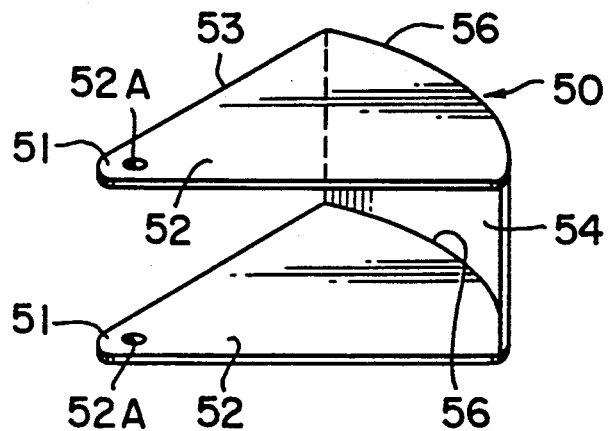
FIG. 7 is a perspective view of the outermost deflector of the propulsion air stream deflector assembly of FIG. 6.
Figure 8:
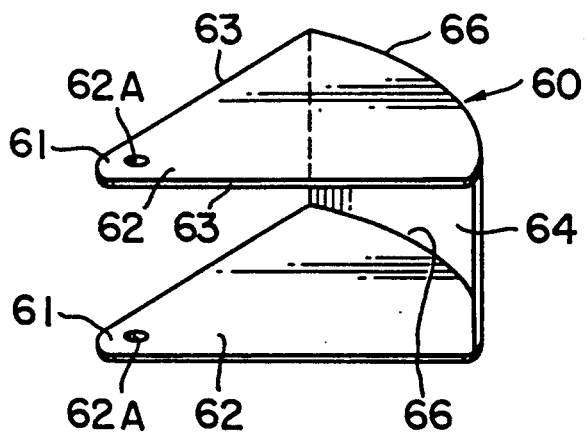
FIG. 8 is a perspective view of the intermediate deflector of the propulsion air stream deflector assembly of FIG. 6.
Figure 9:
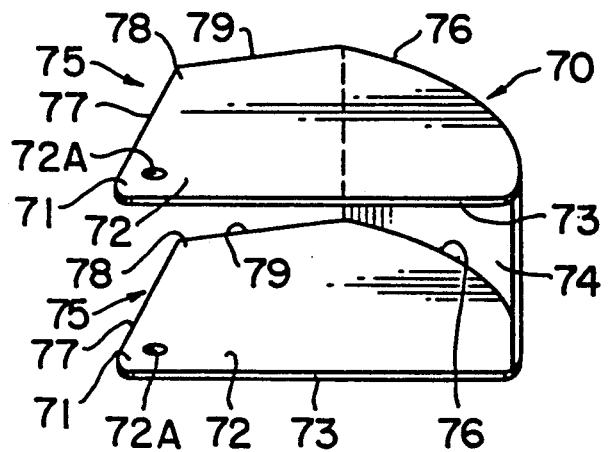
FIG. 9 is a perspective view of the innermost deflector of the propulsion air stream deflector assembly of FIG. 6.

A six baskets type of propulsive air stream deflecting apparatus of the present invention is illustrated in FIG. 6, in which like reference numerals which have been already used for indicating parts of the preceding embodiment designate the corresponding parts throughout several views. In this embodiment, a pair of propulsion air stream deflecting assemblies 5A and 5B are provided instead of the deflectors 3A and 3B. Each of the deflecting assemblies 5A and 5B includes an outermost deflector 50, an intermediate deflector 60 and an innermost deflector 70. The outermost deflectors 50 each have a pair of parallel sector portions 52, 52 (FIG. 7) and an arcuate wall portion 54 joining arcuate edges 56 of the portions 52 together. Each of the sector portions 52 includes an acute apex portion 51 having a through hole 52A. The intermediate deflectors 60 are similar to and smaller in size than the outermost deflector 50. Each of the intermediate deflectors 60 has a pair of parallel sector portions 62, 62 (FIG. 8) and an arcuate wall portion 64 joining arcuate edges 66, 66 of the sector portions 62, 62 together. Each sector portion 62 includes an acute apex portion 61 having a through hole 62A. The innermost deflectors 70 each have a pair of side wall portions 72, 72 (FIG. 9) and an arcuate wall portion 74 joining arcuate edges 76, 76 of the side wall portions 72, 72 together. Each of the side wall portions 72 includes a longer chord edge portion 73 and a convex edge portion 75. The convex edge portions 75 each consist of a shorter chord edge 77 and an abutting edge 79 forming an obtuse corner 78 with the shorter chord edge portion 77. Each of the side wall portions 72 includes an acute apex portion 71 having a through hole 72A. The deflecting assemblies 5A and 5B are angularly movably mounted to the air duct 1 by means of respective vertical pivots 81, 81.

Figure 11:
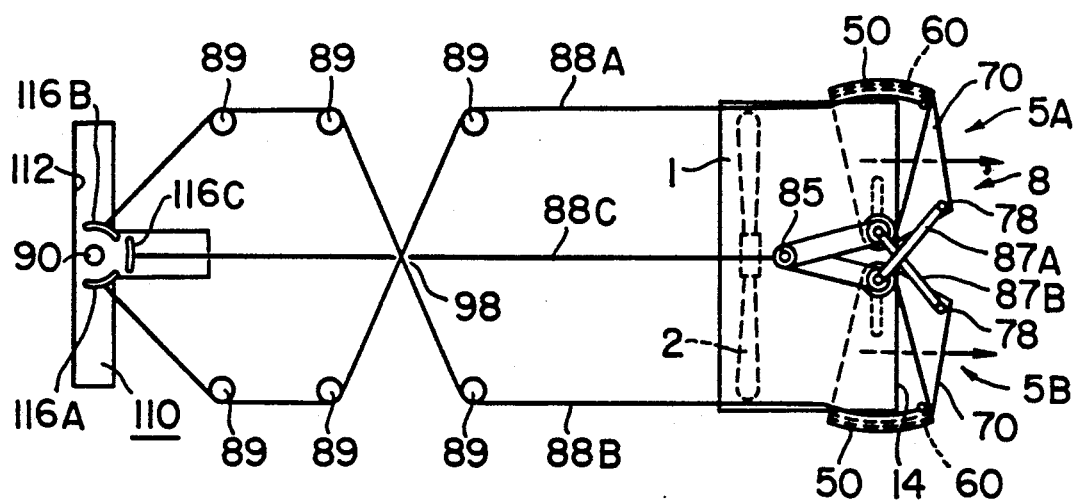
FIG. 11 is a schematic plan view of the air stream deflecting apparatus using the air duct in FIG. 6, showing a forward state in which a backward thrust is created.
Figure 13:
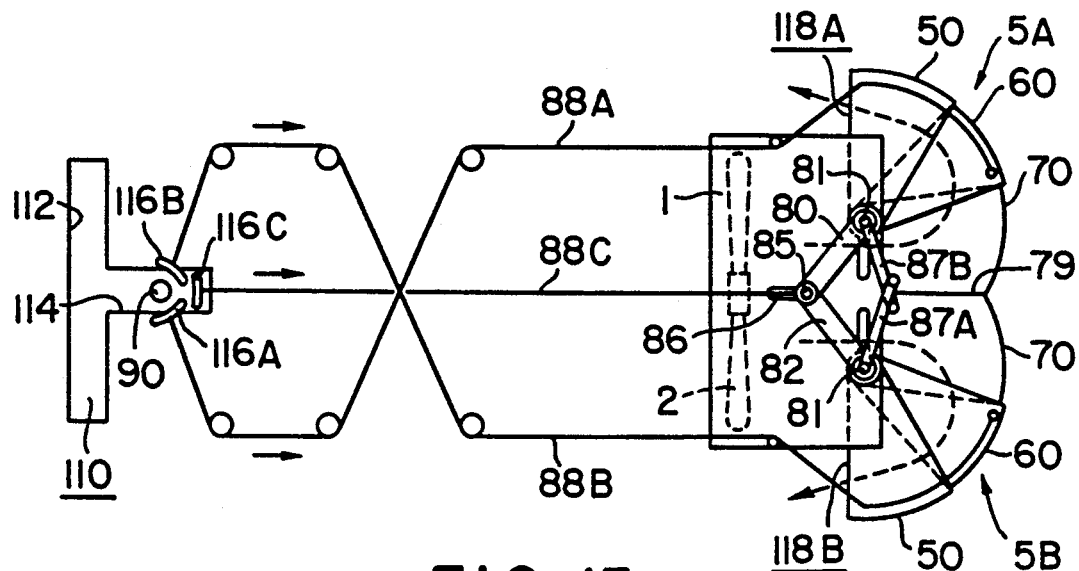
FIG. 13 is a schematic plan view of the air stream deflecting apparatus of FIG. 11, the view showing a state in which a forward thrust is generated.

Each of the deflecting assemblies 5A and 5B has the corresponding vertical pivot 81 extending through the through holes 52A, 62A and 72A of the deflectors 50, 60 and 70 so that the deflectors 50, 60 and 70 are pivotable about the vertical pivot 81. When each deflecting assembly 5A, 5B is at a propulsive thrust producing position shown in FIGS. 6 and 11, the intermediate deflector 60 is received within the outermost deflector 50 while the innermost deflector 70 is received in the intermediate deflector 60. The vertical pivots 81, 81 slidably extend through respective circumferential though slots 83A and 83B which are formed through the rear end portion 10 of the air duct 1 in a horizontally symmetrical fashion about the axis 12. The deflecting assemblies 5A and 5B are connected by a link mechanism 8, which includes a pair of link members 80 and 82 having an equal length. The link member 80 is pivotally connected at one end to the vertical pivot 81 of the starboard side deflecting assembly 5A and at the other end to one end of the other link member 82 through a vertical pivot 85. The link member 82 is pivotally connected at the other end to the vertical pivot 81 of the port side deflecting assembly 5B. The vertical pivot 85 slidably extends through an axial through slot 86. The axial through slot 86 is formed through the air duct 1 at a top portion thereof so that the circumferential through slots 83A and 83B are symmetrical with respect to the axial through slot 86. Although not shown in FIG. 6 for purposes of illustration, the corners 78 of the innermost deflectors 70, 70 of the deflecting assemblies 5A and 5B are, as shown in FIG. 11, connected to the vertical pivots 81, 81 through crossing link members 87A and 87B, respectively. With this link mechanism 8, the deflecting assemblies 5A and 5B are arranged horizontally symmetrically with respect to the axis 12 when those deflecting assemblies 5A and 5B are in propulsive thrust producing positions of FIG. 11 or in the forward thrust producing positions of FIG. 13.

The deflecting assemblies 5A and 5B are controlled by a controlling mechanism including controlling lever 90 and steering cables 88A, 88B and 88C. The controlling lever 90 has a lower end portion 92 (FIG. 10) of a reduced diameter, which portion 92 is mounted to a wrist member 94 for pivotal movement in a first vertical plane y. The wrist member 94 is joined to a bracket 96, mounted on the hull 131, for pivotal movement in a second vertical plane x perpendicular to the first vertical plane y. The controlling lever 90 passes through a T-shaped guide slot 110 formed through a lever cage not shown. The guide slot 110 includes a transverse slot portion 112 and a fore-to-aft slot portion 114 contiguous at one end to an intermediate portion of the transverse slot portion 112. When guided in a transverse slot portion 112, the controlling lever 90 is moved in the vertical plane x while when moved along the fore-to-aft slot portion 114, the controlling lever 90 is angularly moved in the vertical plane y. A pair of opposing lever receivers 116A and 116B are mounted to the lever cage so that those lever receivers 116A and 116B are movable along the transverse slot portion 112 and the fore-to-aft slot portion 114 of the guide slot 110. Another lever receiver 116C is mounted to the lever cage so as to move along the fore-to-aft slot portion 114. The lever receivers 116A, 116B and 116C are spring biased toward respective positions shown in FIGS. 10 and 11. The lever receivers 116A and 116B are connected to the corners of the intermediate deflectors 60 of deflecting assemblies 5A and 5B via cables 88A and 88B, respectively The steering cables 88A and 88B extend around cable guides 89, 89, . . . and cross at a point 98 as shown in FIG. 11. The lever receiver 116C is connected to the vertical pivot 85 of the link mechanism 8 via the steering cable 88C.

Figure 10:
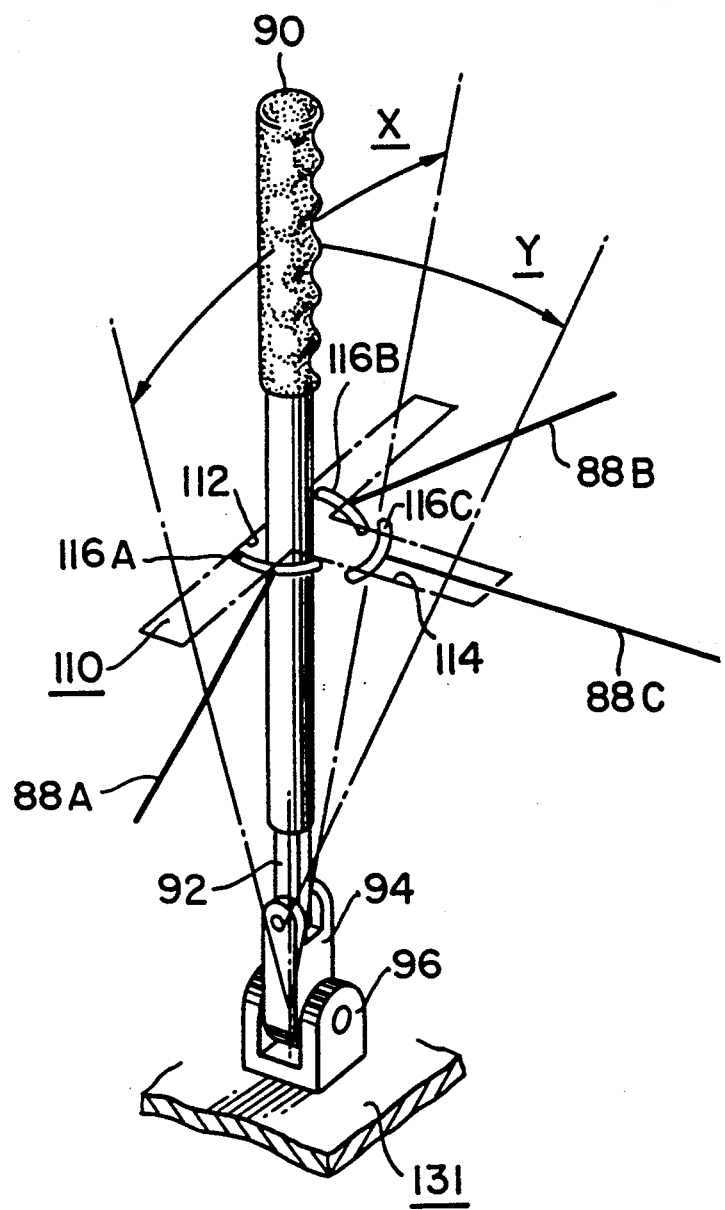
FIG. 10 is a diagrammatic perspective view of a control lever of the propulsion air stream deflector assembly controlling mechanism of the air stream deflecting assemblies in FIG. 6.

In operation, the controlling lever 90 is normally placed at a neutral position shown in FIGS. 10 and 11, that is, a forward position, corresponding to the junction point of the transverse slot portion 112 and the fore-to-aft slot portion 114 of the guide slot 110, for driving the ACV forward. With the controlling lever 90 at the neutral position, the deflectors 50, 60 and 70 of each of the deflecting assemblies 5A and 5B are folded and the deflecting assemblies 5A and 5B are placed in respective propulsive thrust producing positions as illustrated in FIG. 6, with the arcuate wall portions 54, 64 and 74 of those deflectors 50, 60 and 70 located away from the propulsive air stream issuing from the rear open end 14 of the air duct 1. Thus, the propulsive air stream, produced by the propelling fan 2, is allowed to flow backward without substantial resistance from the deflecting assemblies 5A and 5B.

Figure 12:
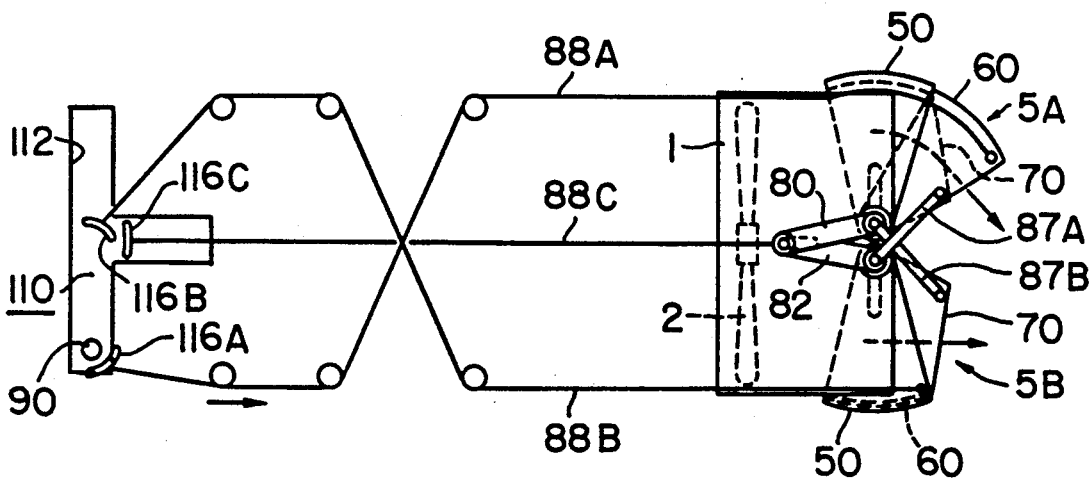
FIG. 12 is a schematic plan view of the air stream deflecting apparatus of FIG. 11, illustrating a state in which a sideward thrust is provided to the ACV.

To turn the ACV to the port side, the controlling lever 90 is moved toward the port side along the transverse slot portion 112, pushing lever receiver 116A against a force exerted by the spring which biases the lever receiver 116A. As a result, the steering cable 88A is pushed to turn the intermediate deflector 60 of the starboard side deflecting assembly 5A about the vertical pivot 81 thereof in the port side direction as shown in FIG. 12 while the port side deflecting assembly 5B is maintained at the propulsive thrust producing position. In this condition, the pressurized air stream, produced by the propelling fan 2, is deflected by the intermediate deflector 60 of the starboard side deflecting assembly 5A as indicated by the arrow shown therein, so that a port side thrust is provided to the ACV. Thus, the ACV can make a rapid turn to the port side by maintaining such an arrangement of the deflecting assemblies 5A and 5B. To turn the ACV to the starboard side, a similar operation of the intermediate deflector 60 of the port side deflecting assembly 5B is carried out by pushing the lever receiver 116B with the controlling lever 90. When the controlling lever 90 is returned to the neutral position, the lever receiver 116A or 116B is returned by the restoring force of the spring thereof to the corresponding initial position shown in FIG. 11 and hence the corresponding intermediate deflector 60 is returned to the propulsive thrust producing position shown therein.

For providing a forward thrust to the ACV, the controlling lever 90 is pulled backward (FIG. 13) to move in the fore-to-aft slot portion 114 of the guide slot 110, so that the lever receivers 116A, 116B and 116C are pushed to move along the fore-to-aft slot portion 114 against their springs. Thus, the vertical pivot 85 of the link mechanism 8 is pushed by the steering cable 88C backward along the axial through slot 86, causing the link members 80 and 82 to turn about the vertical pivot 85 so as to move the vertical pivots 81, 81 away from each other along respective circumferential slots 83A and 83B. This results in the outermost deflectors 50 and 50 of the deflecting assemblies 5A and 5B projecting horizontally outwardly to form discharge openings 118A and 118B, respectively, while the innermost deflectors 70 and 70 of the deflecting assemblies 5A and 5B are pulled to move toward each other by means of link members 87B and 87A. On the other hand, the intermediate deflectors 60, 60 of the deflecting assemblies 5A and 5B are turned by steering cables 88A and 88B about respective vertical pivots 81, 81 so as to move toward each other When the controlling lever 90 reaches a rearward position shown in FIG. 13, the innermost deflectors 70, 70 of the deflecting assemblies 5A and 5B come at edges 79, 79 into abutment against each other while the intermediate deflector 60 of each of the deflecting assemblies 5A, 5B is interposed between a corresponding outermost deflector 50 and innermost deflector 70, partly overlapping the outermost deflector 50 and innermost deflector 70. Thus, the rear end portion 10 of the air duct 1 is covered by the extended deflecting assemblies 5A and 5B, so that the pressurized air stream is deflected and discharged horizontally, obliquely forward through the discharge openings 118A and 118b as indicated by the arrows in FIG. 13. By maintaining these positions of the deflecting assemblies 5A and 5B, the ACV which is advancing is decelerated and then stopped. By further maintaining this condition, the ACV may commence rearward movement. When the controlling lever 90 is moved to the neutral position again, the lever receivers 116A, 116B and 116C are returned by restoring forces of their springs to their initial positions shown in FIG. 11.

The ACV may hover by providing between the innermost deflectors 70, 70 of the deflecting assemblies 5A and 5B such an appropriate gap that a backward thrust which is created by the pressurized air stream issuing out through the gap is made equal to a forward thrust which is provided by the forward air stream deflected with the deflecting assemblies 5A and 5B. Also in this embodiment even a one-engine one-fan type of ACV can achieve hovering.

In the backward thrust producing positions where the outermost deflector 50, intermediate deflector 60 and innermost deflector 70 of each deflecting assembly 5A, 5B are in the nested condition as in FIG. 11, each deflecting assembly 5A, 5B has a small forwardly projected area as compared to that of each air stream deflector 3A, 3B, and hence, has a smaller air resistance which improves the ACV in speed and acceleration.

The control mechanism of the six baskets type of propulsion air stream deflecting apparatus of FIGS. 6-13 may be applied to the two baskets type propulsion air stream deflecting apparatus of FIGS. 1 and 2.

What is claimed is:

1. A propulsive air stream deflecting apparatus of an air cushion vehicle including a hull, said apparatus comprising:

an air duct mounted on the hull and having a longitudinal axis, the air duct having a rear open end;

a propeller fan installed within said duct for producing a propulsive air stream flowing through the air duct out said rear open end to provide thrust to the hull;

a pair of deflecting assemblies mounted to said duct, each of said deflecting assemblies including a plurality of deflecting members each having a substantially arcuate deflecting wall, said deflecting members being nestable one within the other along the deflecting walls thereof, vertically extending pivots mounting said deflecting assemblies, respectively, to said duct at the rear open end thereof in positions that are symmetrical with respect to said longitudinal axis, the arcuate deflecting walls of the deflecting members of each respective one of the deflecting assemblies being concave toward the vertically extending pivot mounting said respective one of the deflecting assembles to the duct, the deflecting members of each respective one of the deflecting assemblies being pivotal, about the pivot mounting said respective one of the deflecting assemblies to the duct, between a retracted nested state and a final telescopically extended state;

said duct having first guide means for supporting and guiding said vertically extending pivots in a manner in which the pivots are movable toward and away from one another, laterally with respect to the longitudinal axis of said duct, between respective laterally inward and outward positions; and control means, operatively connected to said deflecting assemblies and to said pivots, for positioning the deflecting members in both of said deflecting assemblies in said nested retracted state while positioning said pivots at said laterally inward positions to maintain the arcuate deflecting walls of the deflecting members of said deflecting assemblies out of the path of the stream of air flowing from the rear open end of said duct such that a propulsion thrust state is provided in which a forward thrust on the hull is generated by said propeller fan, for maintaining said pivots at said laterally inward positions while selectively moving the deflecting members of either one of said deflecting assemblies from said nested retracted state toward said final telescopically extended state to move the arcuate deflecting walls of the selected one of said deflecting assemblies into the path of the stream of air flowing from the rear open end of said duct such that a steering state is provided in which a sidewards thrust on the hull is generated by said propeller fan, and for moving the deflecting members of both of said deflecting assemblies toward said final telescopically extended state while moving said vertically extended pivots from said laterally inward toward said laterally outward positions to cover the rear open end of said deflecting duct while locating terminal ends of the deflecting assemblies to the outside of said air duct such that a steering state is provided in which the arcuate deflecting walls guide the air flowing from the rear open end of said duct toward the front of the vehicle whereby a rearward thrust on the hull is generated by said propeller fan, said control means comprising a first linkage linking said vertically extending pivots to one another, said first linkage being articulatable between a folded state which locates the pivots at said laterally inward positions and an extended state which locates the pivots at said laterally outward positions, a second linkage linking a most telescopically extendable one of the plurality of deflecting members of one of said deflecting assemblies to the vertically extending pivot mounting the other of said deflecting assemblies to the hull and linking a most telescopically extendable one of the plurality of deflecting members of said other of said deflecting assemblies to the vertically extending pivot mounting said one of the deflecting assemblies to the hull such that when said vertically extending pivots are in said laterally outermost positions, the second linkage places the deflecting members of each of said deflecting assemblies in said final telescopically extended state, and an actuator selectively operable to telescopically extend the deflecting members of either of said deflecting assemblies from said retracted nested state toward said final telescopically extended state and operable to articulate said first linkage between the folded state and the extended state thereof.

2. An apparatus as claimed in claim 1, wherein the plurality of deflecting members of each of said deflecting assemblies include first, second and third deflecting members, the third deflecting member being said most telescopically extendable one of the plurality of deflecting members in each of said deflecting assemblies.

3. An apparatus as claimed in claim 1, wherein said first linkage includes a pair of links having respective first ends thereof pivotally connected to said vertically extending pivots, respectively, a third vertically extending pivot to which respective second ends of both of said links are pivotally connected, and second guide means for supporting and guiding said third vertically extending pivot in a manner in which the third vertically extending pivot is reciprocable in a direction parallel to the longitudinal axis of said duct.

4. An apparatus as claimed in claim 3, wherein said actuator includes a control lever, and cable means operatively connecting the control lever and said third vertically extending pivot such that the control lever is manipulatable to reciprocate said third vertically extending pivot, as guided by said second guide means, in said direction parallel to the longitudinal axis of said duct.

5. An apparatus as claimed in claim 1, wherein said second linkage includes a pair of links extending in a mutually crossing disposition.

6. An apparatus as claimed in claim 1, wherein said air duct has lateral slots extending therein and constituting said first guide means.

* * * * *